US010497274B2

(12) United States Patent
Nishihara

(10) Patent No.: US 10,497,274 B2
(45) Date of Patent: Dec. 3, 2019

(54) QUESTION GENERATING DEVICE, QUESTION GENERATING METHOD, AND IMAGE FORMING APPARATUS

(71) Applicant: KYOCERA Document Solutions Inc., Osaka (JP)

(72) Inventor: Masaaki Nishihara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 25 days.

(21) Appl. No.: 15/795,979

(22) Filed: Oct. 27, 2017

(65) Prior Publication Data

US 2018/0122257 A1 May 3, 2018

(30) Foreign Application Priority Data

Oct. 31, 2016 (JP) .................. 2016-213092

(51) Int. Cl.
| | |
|---|---|
| G09B 7/02 | (2006.01) |
| G06F 17/22 | (2006.01) |
| G06K 9/68 | (2006.01) |
| G06K 9/62 | (2006.01) |
| G06K 9/72 | (2006.01) |
| G06F 17/24 | (2006.01) |
| G06F 17/21 | (2006.01) |
| G06K 9/00 | (2006.01) |

(52) U.S. Cl.
CPC .......... G09B 7/02 (2013.01); G06F 17/2276 (2013.01); G06F 17/243 (2013.01); G06K 9/6263 (2013.01); G06K 9/6878 (2013.01); G06K 9/72 (2013.01); *G06F 17/215* (2013.01); *G06K 9/00402* (2013.01); *G06K 2209/01* (2013.01)

(58) Field of Classification Search
CPC ................................................ G06F 17/30401
See application file for complete search history.

(56) References Cited

U.S. PATENT DOCUMENTS 5,597,311 A * 1/1997 Yanagida .................. G09B 3/04
382/317
6,341,176 B1 * 1/2002 Shirasaki .................. G06K 9/72
382/229

(Continued)

FOREIGN PATENT DOCUMENTS

JP 2007-004523 A 1/2007

*Primary Examiner* — Kavita Padmanabhan
*Assistant Examiner* — Warren Campbell, Jr.
(74) *Attorney, Agent, or Firm* — Studebaker & Brackett PC

(57) ABSTRACT

In a question generating device, a reader reads a document and generates a document image. An extracting section extracts an original form character part on the basis of a marked character part included in the document image. The original form character part represents an original form of a plurality of candidate character parts that are candidate answers to a question generated from the document image. A setting section sets as the plurality of candidate character parts, the original form character part and at least one character part formed by either or both adding a character to and deleting a character from the original form character part. A selecting section selects a candidate character part of the highest priority from among the plurality of candidate character parts. A generating section generates the question using the candidate character part of the highest priority as the answer.

10 Claims, 9 Drawing Sheets

(56) References Cited

U.S. PATENT DOCUMENTS

| | | | |
|---|---|---|---|
| 7,604,161 B2 | 10/2009 | Tamune | |
| 2006/0289625 A1 | 12/2006 | Tamune | |
| 2007/0072164 A1* | 3/2007 | Katsuyama | G09B 5/067 434/353 |
| 2011/0158548 A1* | 6/2011 | Aizawa | G06K 9/723 382/229 |

* cited by examiner

AE

| Plurality of candidate character parts ← E | |
|---|---|
| [ i ] Original form character part | N—⊗⊗⊗—T (RC) <br> E1 |
| [ ii ] A character is added to end of original form character part | ⊗⊗⊗⊗—NT (RC) <br> E2 |
| [ iii ] A character is added to beginning of original form character part | NH—⊗⊗⊗⊗ (RC) <br> E3 |
| [ iv ] Last character of original form character part is deleted | ⊗⊗×—T (RC) <br> E4 |
| [ v ] First character of original form character part is deleted | H—×⊗⊗ (RC) <br> E5 |
| [ vi ] A character is added to end of original form character part and first character of original form character part is deleted | H—×⊗⊗⊗—NT (RC) <br> E6 |
| [ vii ] Last character of original form character part is deleted and a character is added to beginning of original form character part | NH—⊗⊗⊗×—T (RC) <br> E7 |

FIG. 3

| | Condition |
|---|---|
| First condition | Candidate character part is included in dictionary |
| Second condition | Candidate character part represents original form character part |
| Third condition | Difference between candidate character part and original form character part is only single character |
| Fourth condition | Candidate character part includes more characters than other candidate character parts |
| Fifth condition | Last character of candidate character part differs from last character of original form character part |
| Sixth condition | Candidate character part is formed by adding a character to end of original form character part and deleting first character of original form character part |

High ↑

Importance of conditions for determining priority order

↓ Low

FIG. 4

QUESTION GENERATING DEVICE, QUESTION GENERATING METHOD, AND IMAGE FORMING APPARATUS

INCORPORATION BY REFERENCE

The present application claims priority under 35 U.S.C. § 119 to Japanese Patent Application No. 2016-213092, filed on Oct. 31, 2016. The contents of this application are incorporated herein by reference in their entirety.

BACKGROUND

The present disclosure relates to a question generating device, a question generating method, and an image forming apparatus.

Question sheet generating devices that generate question sheets from documents including hand-written marks are known. One of such question sheet generating devices extracts as answers, character strings designated by marks from an image read from a document, and erases the character strings. The question sheet generating device is capable of generating a question sheet and an answer list using erased character strings as answers.

SUMMARY

A question generating device according to the present disclosure includes a reader, an extracting section, a setting section, a selecting section, and a generating section. The reader reads a document and generates a document image. The extracting section extracts an original form character part on the basis of a marked character part included in the document image. The original form character part represents an original form of a plurality of candidate character parts. The plurality of candidate character parts are candidate answers to a question generated from the document image. The setting section sets as the plurality of candidate character parts, the original form character part and at least one character part formed by either or both adding a character to and deleting a character from the original form character part. The selecting section selects a candidate character part of the highest priority from among the plurality of candidate character parts. The generating section generates the question using the candidate character part of the highest priority as an answer.

An image forming apparatus according to the present disclosure includes the above-described question generating device and an image forming section. The image forming section forms on a sheet an image representing the question.

A method for generating a question according to the present disclosure includes: reading and generating; extracting; setting; selecting; and generating the question. In the reading and generating, a document is read and a document image is generated. In the extracting, an original form character part is extracted on the basis of a marked character part included in the document image. The original form character part represents an original form of a plurality of candidate character parts. The plurality of candidate character parts are candidate answers to a question generated from the document image. In the setting, the original form character part and at least one character part formed by either or both adding a character to and deleting a character from the original form character part are set as the plurality of candidate character parts. In the selecting, a candidate character part of the highest priority is selected from among the plurality of candidate character parts. In the generating the question, the question is generated using the candidate character part of the highest priority as an answer.

BRIEF DESCRIPTION OF THE DRAWINGS

FIG. 3 is a diagram illustrating a plurality of candidate character parts set by a setting section of the question generating device according to the first embodiment of the present disclosure.

FIG. 4 is a table describing conditions for determining priority order of the plurality of candidate character parts by the question generating device according to the first embodiment of the present disclosure.

DETAILED DESCRIPTION

Figure 1:
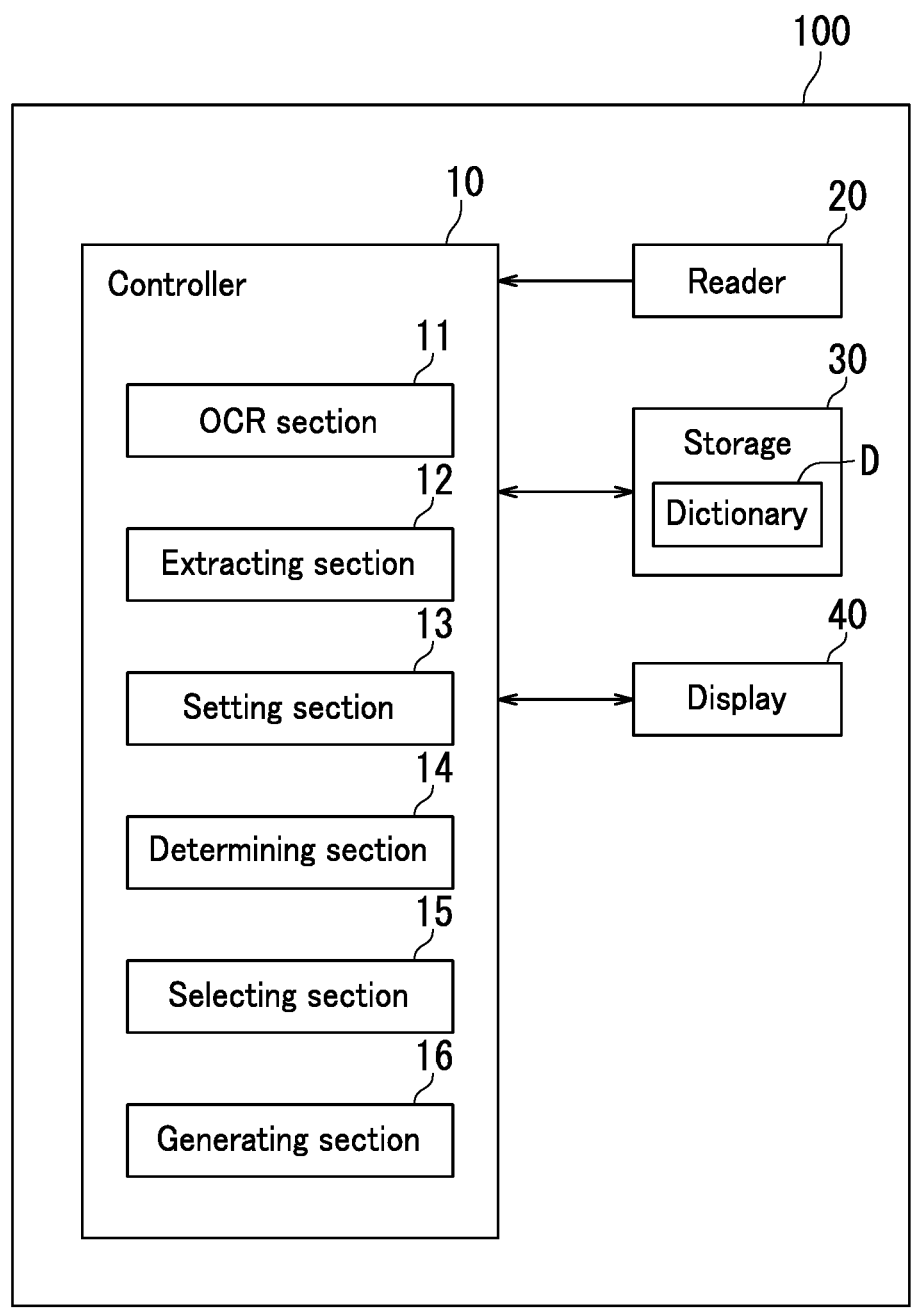
FIG. 1 is a block diagram of a question generating device according to a first embodiment of the present disclosure.

The following describes embodiments of the present disclosure with reference to the drawings. Note that in the drawings, elements that are the same or substantially equivalent are labelled using the same reference signs, and explanations of which will not be repeated.

(First Embodiment)

The following describes with reference to FIG. 1 configuration of a question generating device 100 according to a first embodiment of the present disclosure. FIG. 1 is a block diagram of the question generating device 100. The question generating device 100 includes a controller 10, a reader 20, storage 30, and a display 40. The question generating device 100 is for example a personal computer connected to a scanner. The question generating device 100 generates a question. The question is for example a fill-in-the-blank question. Details of the question will be described further below with reference to FIG. 6.

The reader 20 reads a document and generates document image data. The reader 20 is for example a scanner. Some parts of the document are marked by a user using a writing instrument (for example, a pink highlighter). The document image data is data indicating an image of the document. Hereinafter, the "document image indicated by the document image data generated by the reader 20" will be simply referred to as a "document image". Details of the document image will be described further below with reference to FIG.

2A. The reader 20 generates the document image data by driving an optical system including an image sensor to image the document through irradiation of the document with light. The reader 20 stores the document image data in the storage 30.

The storage 30 includes a main storage device (for example, semiconductor memory) such as a read only memory (ROM) device or a random access memory (RAM) device, and an auxiliary storage device (for example, a hard disk drive). The main storage device stores therein various computer programs executed by the controller 10. The storage 30 stores therein various data (for example, dictionary data, image data, and text data).

The controller 10 includes for example a processor such as a central processing unit (CPU). Through reading and execution by the CPU of a control program stored in the storage 30, the controller 10 implements various functional sections. Specifically, the controller 10 includes as the various functional sections, an OCR section 11, an extracting section 12, a setting section 13, a determining section 14, a selecting section 15, and a generating section 16. The controller 10 controls each element of the question generating device 100.

The OCR section 11 executes optical character recognition (OCR) processing on the document image and generates text data from the document image. The extracting section 12 extracts an original form character part on the basis of a marked character part included in the document image. A character part is a character image representing a single character or a plurality of characters. Details of the OCR section 11 and the extracting section 12 will be described further below with reference to FIGS. 2A and 2B.

The setting section 13 sets as a plurality of candidate character parts, the original form character part and at least one character part formed by either or both adding a character to and deleting a character from the original form character part. Details of the setting section 13 will be described further below with reference to FIG. 3.

The determining section 14 determines priority order of each of the plurality of candidate character parts. Details of the determining section 14 will be described further below with reference to FIG. 4.

The selecting section 15 selects from among the plurality of candidate character parts a candidate character part (hereinafter referred to as a "first candidate character part") of the highest priority. The display 40 displays the first candidate character part and other candidate character parts among the plurality of candidate character parts. Details of the selecting section 15 and the display 40 will be described further below with reference to FIG. 5.

The generating section 16 generates a question using the first candidate character part as the answer. Details of the generating section 16 will be described further below with reference to FIGS. 5 and 6.

Figure 2A:
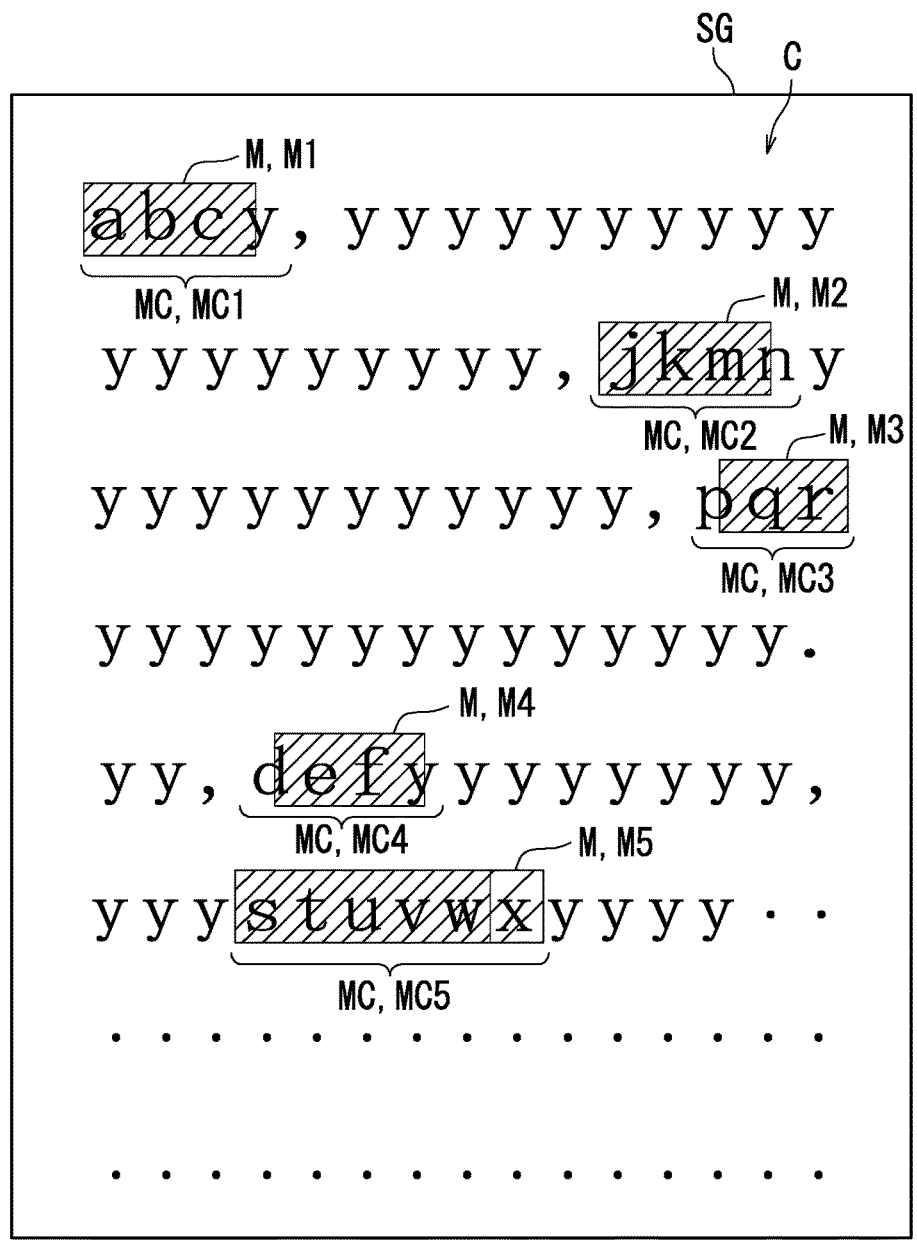
FIG. 2A is a diagram illustrating a document image generated by the question generating device according to the first embodiment of the present disclosure.
Figure 2B:
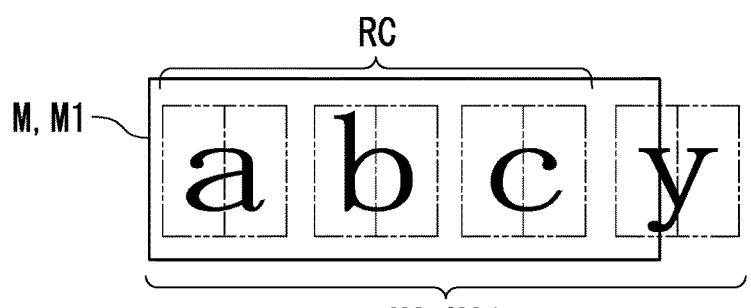
FIG. 2B is a diagram illustrating a marked character part included in the document image generated by the question generating device according to the first embodiment of the present disclosure.

Next, the following describes details of a document image SG the OCR section 11, and the extracting section 12 with reference to FIGS. 2A and 2B. FIG. 2A is a diagram illustrating the document image SG.

As illustrated in FIG. 2A, the document image SG includes a character part C and marking areas M (M1 to M5). The character part C is a character image representing various types of characters (for example, English characters, Japanese characters, or Chinese characters). The character image may include symbols (for example, commas or periods). Each alphabet of "abcy" and the like illustrated in FIG. 2A represents any character image (for example, an English character image, a Japanese character image, or a Chinese character image). The character part C includes character parts MC (MC1 to MC5) that are marked. Hereinafter, the character parts MC that are marked will be referred to as "marked character parts MC". Specifically, the marked character parts MC (MC1 to MC5) are each a single character image or a plurality of character images each partially or entirely overlapping with one of the marking areas M (M1 to M5). The marking areas M (M1 to M5) are images indicating marked areas of the document image SG. Character parts "a", "b", and "c" entirely overlap with the marking area M1, and a character part "y" partially overlaps with the marking area M1. Therefore, the marked character part MC1 indicates a character part "abcy". Similarly, the marked character parts MC2 to MC5 respectively indicate character parts "jkmn", "pqr", "defy", and "stuvwx".

The OCR section 11 detects the character part C from the document image SG. The OCR section 11 converts characters included in the character part C to text data. The OCR section 11 stores in the storage 30 the text data of the character part C in association with the character part C and position information of the character part C in the document image SG. The position information of the character part C indicates for example an X-axis position and a Y-axis position of the character part C.

FIG. 2B is a diagram illustrating the marked character part MC (MC1). The extracting section 12 detects the marked character parts MC (MC1 to MC5) from the document image SG. The extracting section 12 extracts an original form character part RC from each of the marked character parts MC (MC1 to MC5). The original form character part RC is a single character image or a plurality of character images each overlapping with one of the marking areas M (M1 to M5) entirely or at least at a predetermined rate. The predetermined rate is set by a user's operation or default in advance, and is a half for example. The original form character part RC is associated with text data and represents an original form of a plurality of candidate character parts. Details of the plurality of candidate character parts will be described further below with reference to FIG. 3.

For example, the extracting section 12 extracts a character part "abc" as the original form character part RC from the marked character part MC (MC1). At this time, the extracting section 12 does not extract as the original form character part RC the character part "y" following the character part "abc", since the character part "v" following the character part "abc" overlaps with the marking area M (M1) at a rate smaller than a half.

Next, the following describes details of the setting section 13 with reference to FIG. 3. FIG. 3 is a diagram illustrating a plurality of candidate character parts E set by the setting section 13. Each candidate character part E is a single character image or a plurality of character images associated with text data. The setting section 13 sets the plurality of candidate character parts E (E1 to E7) as candidate answers AE to a question on the basis of the text data and position information of the character part C.

Specifically, as illustrated at [i] in FIG. 3, the setting section 13 sets the original form character part RC as the candidate character part E1 among the plurality of candidate character parts E. Further, as illustrated from [ii] to [vii] in FIG. 3, the setting section 13 sets as the candidate character parts E2 to E7 among the plurality of candidate character parts E, character parts formed by either or both adding a character to and deleting a character from the original form character part RC. Details of the candidate character parts E2 to E7 are as follows.

As illustrated at [ii] in FIG. 3, the candidate character part E2 is a character part formed by adding a character NT (hereinafter referred to as an "adjacent-to-end character NT") that is adjacent to the end of the original form character part RC to the end of the original form character part RC.

As illustrated at [iii] in FIG. 3, the candidate character part E3 is a character part formed by adding a character NH (hereinafter referred to as an "adjacent-to-beginning character NH") that is adjacent to the beginning of the original form character part RC to the beginning of the original form character part RC.

As illustrated at [iv] in FIG. 3, the candidate character part E4 is a character part formed by deleting a last character T of the original form character part RC from the original form character part RC. The last character T is a character located at the end of the original form character part RC.

As illustrated at [v] in FIG. 3, the candidate character part E5 is a character part formed by deleting a first character H of the original form character part RC from the original form character part RC. The first character H is a character located at the beginning of the original form character part RC.

As illustrated at [vi] in FIG. 3, the candidate character part E6 is a character part formed by adding the adjacent-to-end character NT to the end of the original form character part RC and deleting the first character H from the original form character part RC.

As illustrated at [vii] in FIG. 3, the candidate character part E7 is a character part formed by deleting the last character T from the original form character part RC and adding the adjacent-to-beginning character NH to the beginning of the original form character part RC.

Next, the following describes details of the determining section 14 with reference to FIGS. 3 and 4. FIG. 4 is a table describing conditions for determining priority order of the plurality of candidate character parts E (E1 to E7) by the question generating device 100. In Table 4, the conditions are indicated as "first condition" to "sixth condition" in order of higher importance. The priority order indicates order of conditions prioritized by the determining section 14 when determining a candidate character part E among the plurality of candidate character parts E (E1 to E7) as an answer to a question.

The determining section 14 searches a dictionary D for each of the plurality of candidate character parts E1 to E7. The dictionary D is dictionary data stored in the storage 30 in advance (see FIG. 1). The dictionary data include word data indicating words of a language or languages. The dictionary D is for example dictionary data (for example, an English-English dictionary) for the English language, dictionary data (for example, a Japanese-Japanese dictionary) for the Japanese language, or dictionary data (for example, a Xinhua Dictionary) for the Chinese language.

As described in FIG. 4, the "first condition" is that "the candidate character part E is included in the dictionary D". The determining section 14 determines priority order of each of the candidate character parts E1 to E7 on the basis of whether or not each of the candidate character parts E1 to E7 is included in the dictionary D. The determining section 14 determines that priority order of a candidate character part E included in the dictionary D is higher than priority order of another candidate character part E that is not included in the dictionary D. Specifically, with respect to each of the candidate character parts E (E1 to E7) set for a marked character part MC, the determining section 14 confirms whether or not the candidate character part E is identical with word data included in the dictionary D. The determining section 14 determines that among the plurality of candidate character parts E (E1 to E7), priority order of a candidate character part E identical with word data included in the dictionary D is higher than priority order of another candidate character part E that is not identical with word data included in the dictionary D.

The "second condition" is that "the candidate character part E represents the original form character part RC", that is, the candidate character part E is the candidate character part E1. The determining section 14 determines whether or not the candidate character part E satisfies both the above-described "first condition" and the "second condition". When the candidate character part E1 is included in the dictionary D, the determining section 14 determines the candidate character part E1 as the first candidate character part.

The "third condition" is that "difference between the candidate character part E and the original form character part RC is only a single character", that is, the candidate character part E is any of the candidate character parts E2 to E5.

The "fourth condition" is that "the candidate character part E includes more characters than other candidate character parts E".

The "fifth condition" is that "the last character of the candidate character part E differs from the last character T of the original form character part RC". For example, the last character T of the original form character part RC differs from the last character of the candidate character part E2 and is the same as the last character of the candidate character part E3. Therefore, the determining section 14 determines that priority order of the candidate character part E2 is higher than priority order of the candidate character part E3. Similarly, the determining section 14 determines that priority order of the candidate character part E4 is higher than priority order of the candidate character part E5.

The "sixth condition" is that "the candidate character part E is formed by adding the character NT to the end of the original form character part RC and deleting the first character H of the original form character part RC", that is, the candidate character part E is the candidate character part E6. For example, in comparison between the candidate character part E6 and the candidate character part E7, the determining section 14 determines that priority order of the candidate character part E6 is higher than priority order of the candidate character part E7.

Specific examples of determination of priority order of the candidate character parts E (E1 to E7) are shown in Tables 1 to 5 below. With respect to the marked character part MC1 "abcy" (see FIGS. 2A and 2B), the determining section 14 determines priority order of the candidate character parts E1 to E7 as shown in Table 1.

TABLE 1

| | Original form character part abc | | |
| --- | --- | --- | --- |
| Candidate character part | Represent original form character part? | Included in dictionary? | Priority order |
| abc | YES | YES | 1st |
| abcy | NO | NO | 3rd |
| ☐abc | NO | NO | 4th |
| ab | NO | YES | 2nd |
| bc | NO | NO | 5th |
| bcy | NO | NO | 6th |
| ☐ab | NO | NO | 7th |

In Table 1. "abc" corresponds to the original form character part RC and the candidate character part E1. Also, "abcy", "☐abc". "ab", "bc", "bcy", and "☐ab" respectively correspond to the candidate character parts E2 to E7. Note that "☐" represents a blank in which no character image is present.

Among the candidate character parts E1 to E7, only the candidate character part E1 "abc" is included in the dictionary D and further represents the original form character part RC. Therefore, only the candidate character part E1 "abc" satisfies at least the "first condition" and the "second condition". The determining section 14 determines priority order of the candidate character part E1 to be the first (highest).

Among the remaining candidate character parts E2 to E7, only the candidate character part E4 "ab" satisfies at least the "first condition". The determining section 14 determines priority order of the candidate character part E4 to be the second.

Among the remaining candidate character parts E2, E3, and E5 to E7, only the candidate character part E2 "'abcy'" satisfies at least the "third condition", the "fourth condition", and the "fifth condition". The determining section 14 determines priority order of the candidate character part E2 to be the third.

Among the remaining candidate character parts E3 and E5 to E7, only the candidate character part E3 "☐abc" satisfies at least the "third condition" and the "fourth condition". The determining section 14 determines priority order of the candidate character part E3 to be the fourth.

Among the remaining candidate character parts E5 to E7, only the candidate character part E5 "bc" satisfies at least the "third condition". The determining section 14 determines priority order of the candidate character part E5 to be the fifth.

Among the remaining candidate character parts E6 and E7, only the candidate character part E6 "bcy" satisfies at least the "fourth" condition. The determining section 14 determines priority order of the candidate character part E6 to be the sixth, and priority order of the remaining candidate character part E7 to be the seventh.

Also, with respect to the marked character part MC2 "jkmn" (see FIG. 2A), the determining section 14 determines priority order of the candidate character parts E1 to E7 as shown in Table 2.

TABLE 2

| | Original form character part jkm | | |
|---|---|---|---|
| Candidate character part | Represent original form character part? | Included in dictionary? | Priority order |
| jkm | YES | YES | 1st |
| jkmn | NO | YES | 2nd |
| .jkm | NO | NO | 4th |
| jk | NO | YES | 3rd |
| km | NO | NO | 5th |
| kmn | NO | NO | 6th |
| .jk | NO | NO | 7th |

In Table 2, "jkm" corresponds to the original form character part RC and the candidate character part E1. Also, "jkmn", ".jkm". "jk", "km", "kmn", and ".jk" respectively correspond to the candidate character parts E2 to E7.

For example, among the candidate character parts E2 to E7, only the candidate character part E2 "jkmn" satisfies at least the "first condition", the "third condition", and the "fourth condition". The determining section 14 determines priority order of the candidate character part E2 to be the second.

Also, with respect to the marked character part MC3 "pqr" (see FIG. 2A), the determining section 14 determines priority order of the candidate character parts E1 to E7 as shown in Table 3.

TABLE 3

| | Original form character part qr | | |
|---|---|---|---|
| Candidate character part | Represent original form character part? | Included in dictionary? | Priority order |
| qr | YES | YES | 1st |
| qry | NO | NO | 6th |
| pqr | NO | YES | 2nd |
| q | NO | YES | 3rd |
| r | NO | YES | 4th |
| ry | NO | NO | 7th |
| pq | NO | YES | 5th |

In Table 3, "qr" corresponds to the original form character part RC and the candidate character part E1. Also, "qry", "pqr", "q", "r". "ry", and "pq" respectively correspond to the candidate character parts E2 to E7.

Also, with respect to the marked character part MC4 "defy" (see FIG. 2A), the determining section 14 determines priority order of the candidate character parts E1 to E7 as shown in Table 4.

TABLE 4

| | Original form character part efy | | |
|---|---|---|---|
| Candidate character part | Represent original form character part? | Included in dictionary? | Priority order |
| efy | YES | NO | 2nd |
| efyy | NO | NO | 3rd |
| defy | NO | NO | 4th |
| ef | NO | NO | 5th |
| fy | NO | NO | 6th |
| fyy | NO | NO | 7th |
| def | NO | YES | 1st |

In Table 4, "efy" corresponds to the original form character part RC and the candidate character part E1. Also, "efyy", "defy". "ef", "fy", "fyy", and "def" respectively correspond to the candidate character parts E2 to E7.

For example, among the candidate character parts E1 to E7, only the candidate character part E7 "def" satisfies at least the "first condition". The determining section 14 determines priority order of the candidate character part E7 to be the first.

Also, with respect to the marked character part MC5 "stuvwx" (see FIG. 2A), the determining section 14 determines priority order of the candidate character parts E1 to E7 as shown in Table 5.

TABLE 5

| Candidate character part | Represent original form character part? | Included in dictionary? | Priority order |
|---|---|---|---|
| stuvw | YES | NO | 3rd |
| stuvwx | NO | YES | 1st |
| ystuvw | NO | NO | 4th |
| stuv | NO | YES | 2nd |
| tuvw | NO | NO | 5th |
| tuvwx | NO | NO | 6th |
| ystuv | NO | NO | 7th |

Original form character part stuvw

In Table 5, "stuvw" corresponds to the original form character part RC and the candidate character part E1. Also, "stuvwx", "ystuvw", "stuv", "tuvw", "tuvwx", and "ystuv" respectively correspond to the candidate character parts E2 to E7.

Figure 5:
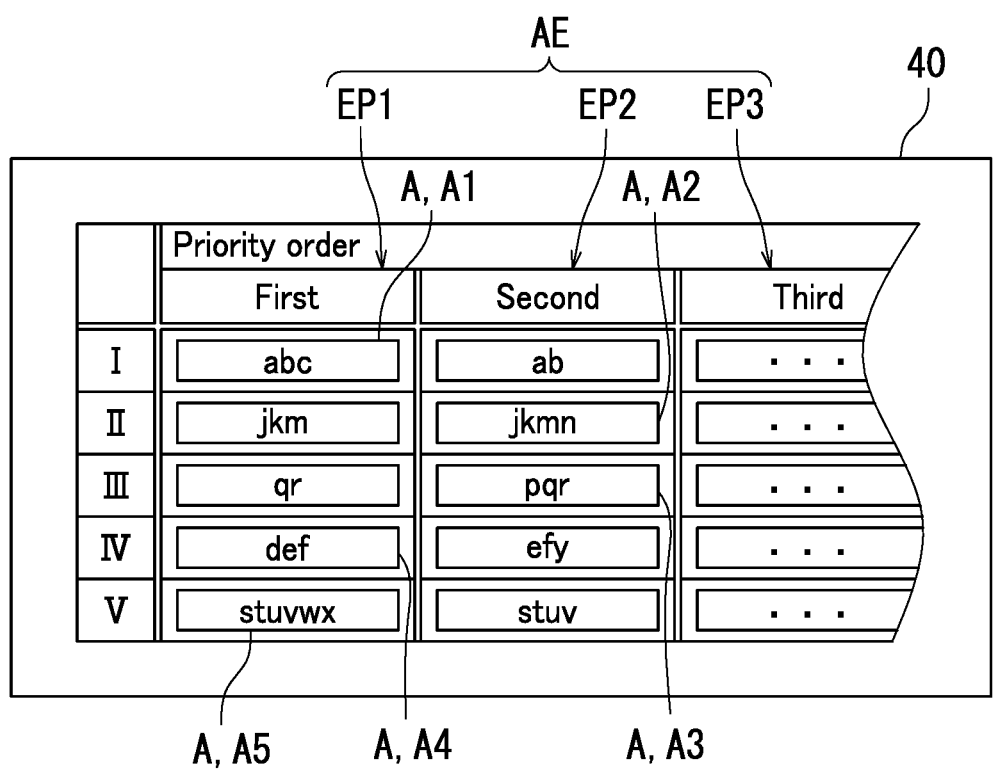
FIG. 5 is a diagram illustrating a display of the question generating device according to the first embodiment of the present disclosure.

Next, the following describes details of the selecting section 15 and the display 40 with reference to FIG. 5. FIG. 5 is a diagram illustrating the display 40 of the question generating device 100.

The selecting section 15 selects the first candidate character part EP1 and other candidate character parts E from among the plurality of candidate character parts E (E1 to E7). The other candidate character parts E are a predetermined number of candidate character parts E that succeed the first candidate character part EP1 in priority order. The predetermined number is set by a user's operation or default in advance, and is two for example. In a situation in which the predetermined number is two, the selecting section 15 selects the first candidate character part EP1, a candidate character part E (hereinafter referred to as a "second candidate character part EP2") of the second priority, and a candidate character part E (hereinafter referred to as a "third candidate character part EP3") of the third priority.

The display 40 is for example a display device, such as a liquid crystal display (LCD) or an electro luminescence display (ELD), having a touch panel function. The display 40 also functions as a part of an input section. Alternatively, the input section may be implemented by a mouse, a keyboard, or the like. The user inputs various settings by operating the input section.

The display 40 displays the first candidate character part EP1 and the other candidate character parts E that are selected by the selecting section 15. For example, the display 40 displays as candidate answers AE, the first candidate character part EP1 to the third candidate character part EP3 that are selected by the selecting section 15. The display 40 displays the first candidate character part EP1 to the third candidate character part EP3 in each of rows "I" to "V" illustrated in FIG. 5. The rows "I" to "V" respectively correspond to the marked character parts MC1 to MC5.

When designating the second candidate character part EP2 or the third candidate character part EP3 as an answer A, the user selects the second candidate character part EP2 or the third candidate character part EP3 through operation on the display 40. When neither the second candidate character part EP2 nor the third candidate character part EP3 is selected by the user, the first candidate character part EP1 is selected as the answer A. For example, with respect to the rows "II" and "III" only, the user selects an answer A (A2) "jkmn" and an answer A (A3) "pqr" through operation on the display 40. With respect to the rows "I", "IV", and "V", answers A (A1) "abc", A (A4) "def", and A (A5) "stuvwx" are selected.

Figure 6:
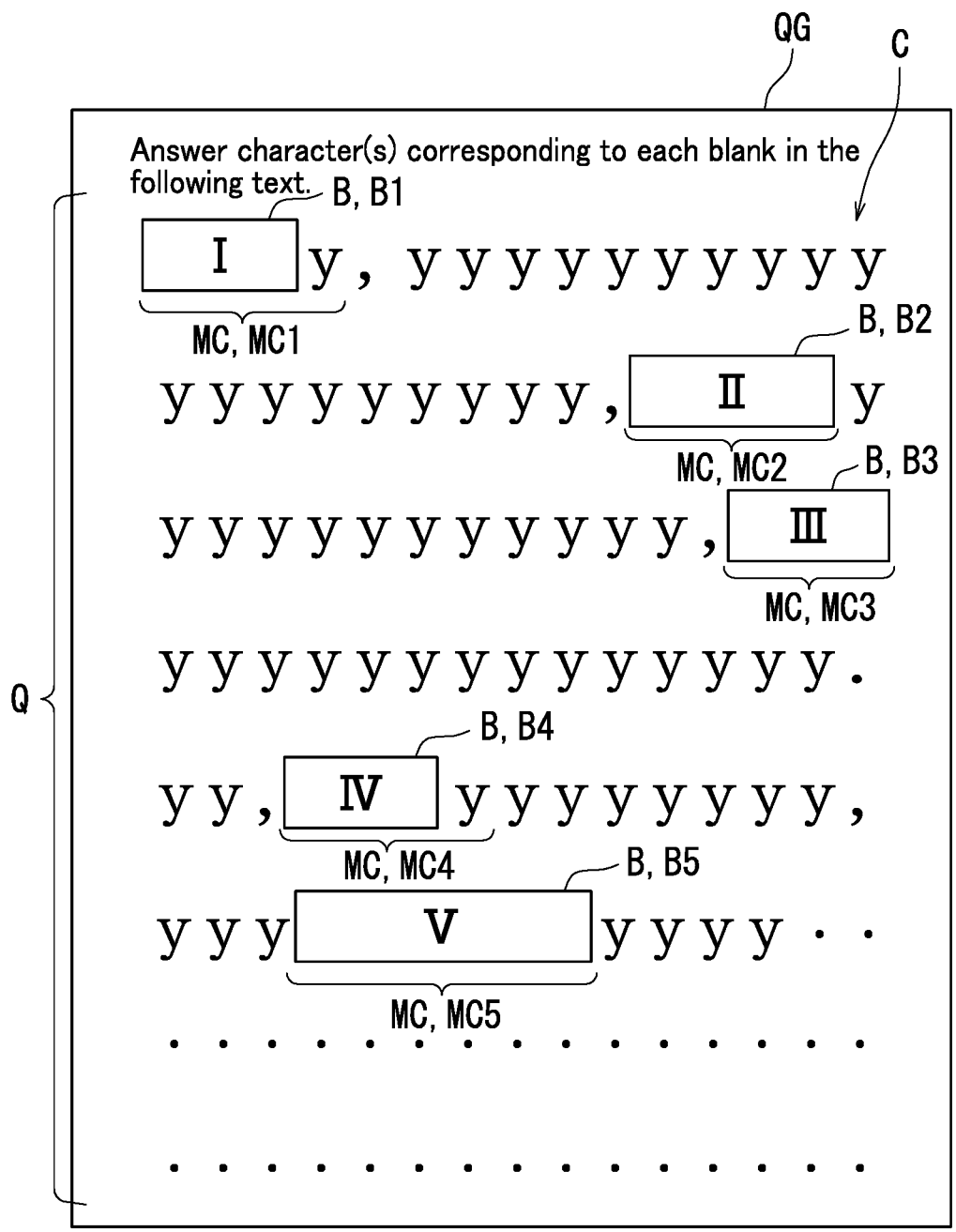
FIG. 6 is a diagram illustrating a question image generated by the question generating device according to the first embodiment of the present disclosure.

Next, the following describes details of the generating section 16 with reference to FIGS. 5 and 6. FIG. 6 is a diagram illustrating a question image QG. The question image QG includes a question Q. The question Q is a character part C including blanks B. and for example a fill-in-the-blank question. The fill-in-the-blank question is a question that presents a sentence, part of which includes a word represented by a blank B, and requires an answerer to give an answer A (word) corresponding to the blank B. In FIG. 6, "I" to "V" respectively correspond to "I" to "V" in FIG. 5.

The generating section 16 generates the question Q using as the answer A, the first candidate character part EP1 among the plurality of candidate character parts E. By contrast, in a situation in which the user has selected another candidate character part E, the generating section 16 generates the question Q using the other candidate character part E as the answer A, instead of the first candidate character part EP1. The generating section 16 stores in the storage 30 question image data indicating the question image QG.

For example, with respect to each of the marked character parts MC1, MC4, and MC5, the generating section 16 replaces the first candidate character part EP1 with the blank B (B1, B4, or B5) as illustrated in FIG. 6. By contrast, in a situation in which the user has selected the second candidate character part EP2 or the third candidate character part EP3 with respect to each of the marked character parts MC2 and MC3, the generating section 16 replaces the second candidate character part EP2 or the third candidate character part EP3 with the blank B (B2 or B3).

Figure 7:
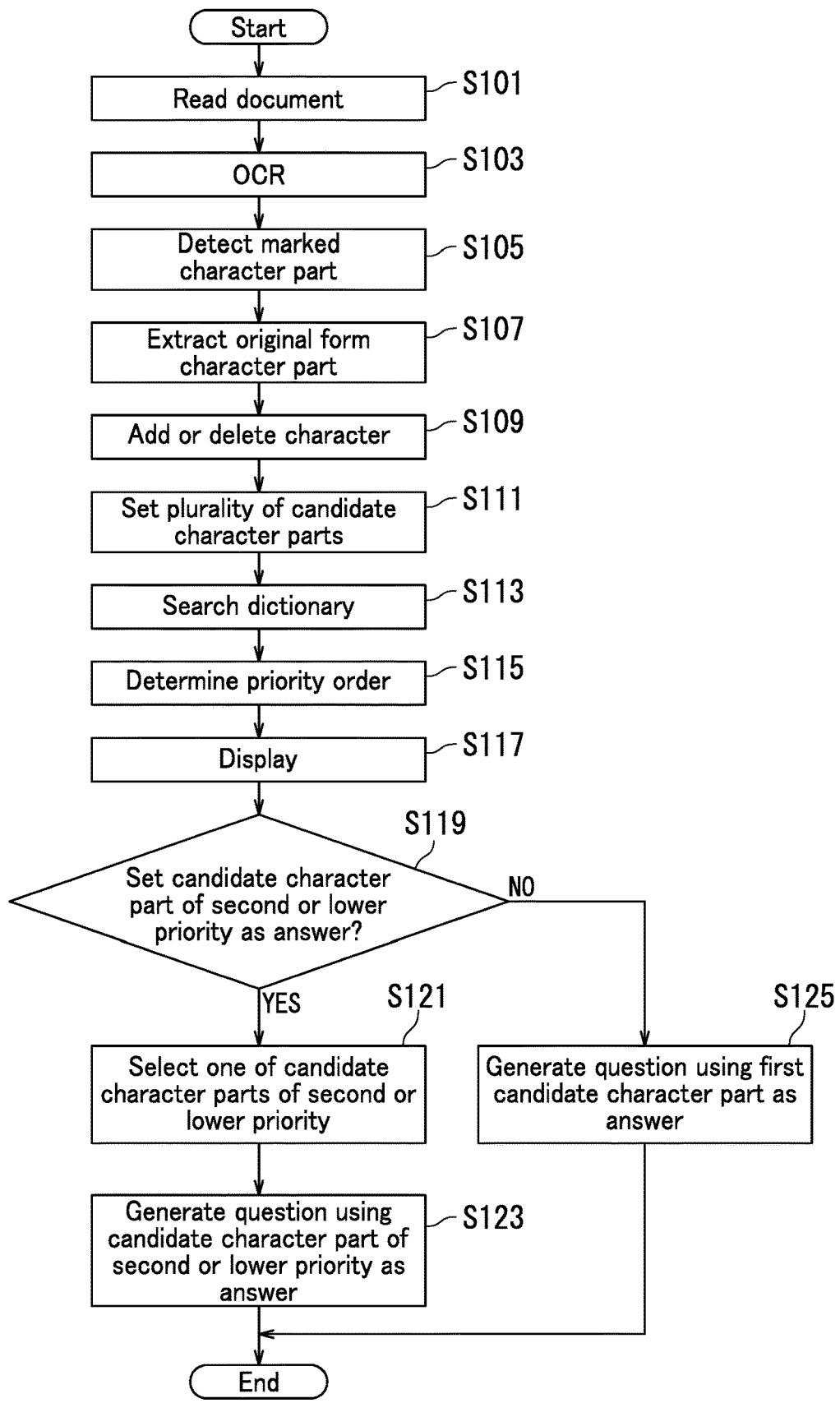
FIG. 7 is a flowchart illustrating question generating processing executed by the question generating device according to the first embodiment of the present disclosure.

Next, the following describes question generating processing executed by the question generating device 100, with reference to FIG. 7. FIG. 7 is a flowchart illustrating the question generating processing. Through execution of Steps S101 to S125, the question generating device 100 generates the question Q. The following specifically describes the question generating processing.

At Step S101, the reader 20 reads a document and generates document image data. The processing proceeds to Step S103.

Next at Step S103, the OCR section 11 executes the OCR processing on the document image SG and converts characters included in the character part C to text data. The processing proceeds to Step S105.

Next at Step S105, the extracting section 12 detects the marked character part MC from the document image SG. The processing proceeds to Step S107.

Next at Step S107, the extracting section 12 extracts the original form character part RC from the marked character part MC. The processing proceeds to Step S109.

Next at Step S109, the setting section 13 either or both adds a character to and deletes a character from the original form character part RC. The processing proceeds to Step S111.

Next at Step S111, the setting section 13 sets as the plurality of candidate character parts E, the original form character part RC and character parts formed by either or both adding a character to and deleting a character from the original form character part RC. The processing proceeds to Step S113.

Next at Step S113, the determining section 14 searches the dictionary D for each of the plurality of candidate character parts E. The processing proceeds to Step S115.

Next at Step S115, the determining section 14 determines priority order of the plurality of candidate character parts E on the basis of whether or not each of the plurality of candidate character parts E is included in the dictionary D. The selecting section 15 selects the first candidate character part EP1 and other candidate character parts E from among the plurality of candidate character parts E. The processing proceeds to Step S117.

Next at Step S117, the display 40 displays the first candidate character part EP1 and a predetermined number of candidate character parts E succeeding the first candidate character part EP1 that are selected by the selecting section 15. The processing proceeds to Step S119.

Next at Step S119, the user gives instruction as to whether or not to set a candidate character part E of the second or lower priority as the answer A. When the user sets a candidate character part E of the second or lower priority as the answer A (YES at Step S119), the processing proceeds to step S121. By contrast, when the user does not set a candidate character part E of the second or lower priority as the answer A (NO at Step S119), the processing proceeds to Step S125.

Next at Step S121, the user selects, through operation on the display 40, a candidate character part E from among the predetermined number of candidate character parts E succeeding the first candidate character part EP1. The processing proceeds to Step S123.

Next at Step S123, the generating section 16 generates the question Q using as the answer A the candidate character part E of the second or lower priority selected by the user, instead of the first candidate character part EP1. Then, the processing ends.

When NO at Step S119 described above, at Step S125, the generating section 16 generates the question Q using the first candidate character part EP1 as the answer A. Then, the processing ends.

As described above with reference to FIGS. 1 to 7, the extracting section 12 extracts the original form character part RC on the basis of the marked character part MC. The setting section 13 sets as the plurality of candidate character parts E (E1 to E7) the original form character part RC and character parts formed by either or both adding a character to and deleting a character from the original form character part RC. The selecting section 15 selects the first candidate character part EP1 from among the plurality of candidate character parts E (E1 to E7). The generating section 16 generates the question Q using the first candidate character part EP1 as the answer A. Therefore, the marked character part MC can be modified without the user needing to mark the document again. As a result, a character part that is not intended by the user to be the answer A can be prevented from being set as the answer A.

Further, according to the first embodiment, when the user selects a candidate character part E other than the first candidate character part EP1 from among the plurality of candidate character parts E (E1 to E7), the generating section 16 generates the question Q using the selected candidate character part E as the answer A, instead of the first candidate character part EP1. Therefore, a marking target that the user intended to be the answer A can be easily set by the user as the answer A.

Further, according to the first embodiment, the determining section 14 determines priority order of the candidate character parts E on the basis of whether or not each of the plurality of candidate character parts E (E1 to E7) is included in the dictionary. Therefore, a character part that may include a typographical error can be prevented from being set as the answer A.

Further, according to the first embodiment, the setting section 13 sets the candidate character parts E2 and E3 among the plurality of candidate character parts E. Therefore, in a situation of typical marking mistake by the user in which a length of the marking area M is shorter by a length of approximately a character than a length that the user intended to mark, discrepancy between a character part that the user intended to mark and the answer A is less likely to occur.

Further, according to the first embodiment, the setting section 13 sets the candidate character parts E4 and E5 among the plurality of candidate character parts E. Therefore, in a situation of typical marking mistake by the user in which a length of the marking area M is longer by a length of approximately a character than a length that the user intended to mark, discrepancy between a character part that the user intended to mark and the answer A is less likely to occur.

Further, according to the first embodiment, the setting section 13 sets the candidate character parts E6 and E7 among the plurality of candidate character parts E. Therefore, in a situation of typical marking mistake by the user in which the marking area M is displaced forward or backward from the position of the original form character part RC by a length of approximately a character, discrepancy between a character part that the user intended to mark and the answer A is less likely to occur.

(Second Embodiment)

Figure 8:
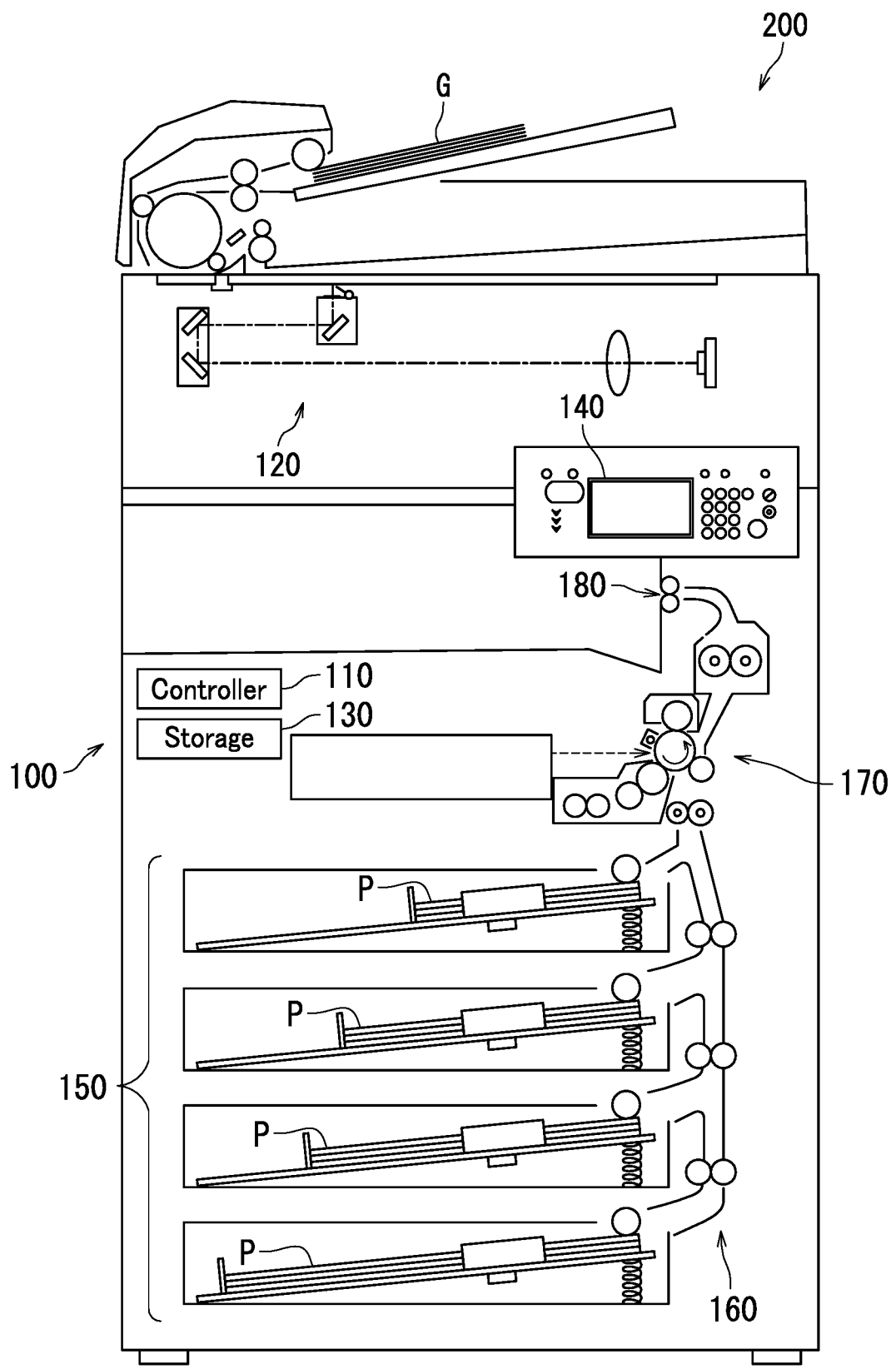
FIG. 8 is a diagram illustrating an image forming apparatus according to a second embodiment of the present disclosure.

Next, the following describes with reference to FIG. 8 an image forming apparatus 200 according to a second embodiment of the present disclosure. FIG. 8 is a diagram illustrating the image forming apparatus 200. The image forming apparatus 200 is a multifunction peripheral. The image forming apparatus 200 includes a controller 110, a reader 120, storage 130, a display 140, a feeding section 150, a conveyance section 160, an image forming unit 170, and an ejection section 180. The controller 110, the reader 120, the storage 130, and the display 140 constitute the question generating device 100 according to the first embodiment. Specifically, the controller 110 functions as the controller 10 according to the first embodiment. The reader 120 functions as the reader 20 according to the first embodiment. The storage 130 functions as the storage 30 according to the first embodiment. The display 140 functions as the display 40 according to the first embodiment.

The controller 110 includes a CPU and controls operation of the image forming apparatus 200 through execution of a computer program stored in the storage 130. The reader 120 reads an image formed on a document G. The storage 130 includes a main storage device and an auxiliary storage device. The display 140 is a display device having a touch panel function. The feeding section 150 accommodates a plurality of sheets P and conveys each sheet P to the conveyance section 160. The sheet P is for example a paper sheet or a synthetic resin sheet. The conveyance section 160 includes a plurality of conveyance roller pairs and conveys the sheet P to the image forming unit 170. The image forming unit 170 is an example of an "image forming section". The image forming unit 170 forms an image (for example, the question image QG) on the sheet P by an electrophotographic method and fixes the image to the sheet P through application of heat and pressure. The conveyance section 160 conveys the sheet P to which the image has been fixed to the ejection section 180. The ejection section 180 ejects the sheet P to the outside of the image forming apparatus 200.

Figure 9:
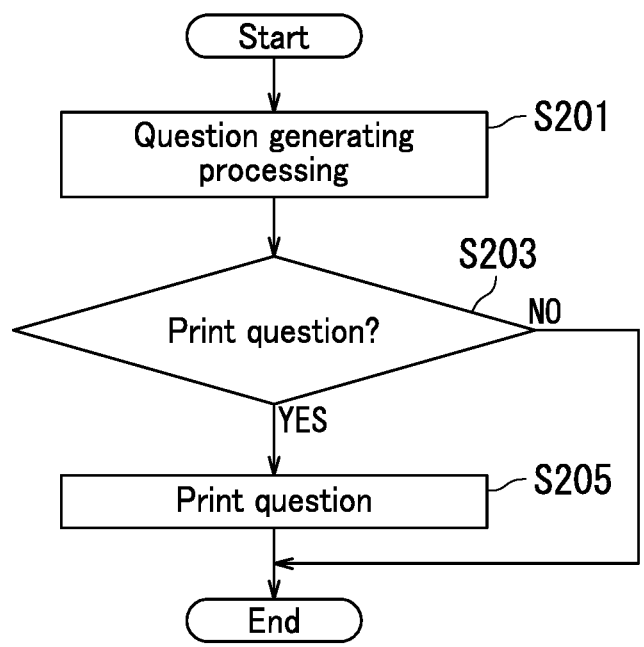
FIG. 9 is a flowchart illustrating question generating processing and question printing processing executed by the image forming apparatus according to the second embodiment of the present disclosure.

Next, the following describes question generating processing and question printing processing executed by the image forming apparatus 200, with reference to FIG. 9. FIG. 9 is a flowchart illustrating the question generating processing and the question printing processing. The image forming apparatus 200 prints the question image QG on the sheet P through execution of steps S201 to S205. The following specifically describes the question generating processing and the question printing processing.

At Step S201, the question generating processing is executed similarly to Steps S101 to S125 explained above with reference to FIG. 7. The processing proceeds to Step S203.

Next at Step S203, the user gives instruction as to whether or not to print the question Q. Specifically, the user touches a "print start" button on the touch panel to execute instruction for the question image QG to be printed. When printing the question Q (YES at Step S203), the processing proceeds to Step S205. By contrast, when not printing the question Q (NO at Step S203), the processing ends.

Next at Step S205, the image forming apparatus 200 prints the question image QG on the sheet P. Then, the processing ends.

Through the above, the embodiments of the present disclosure have been described with reference to the drawings (FIGS. 1 to 9). However, it should be noted that the present disclosure is not limited to the above embodiments and is practicable in various manners within a scope not departing from the gist of the present disclosure (for example, as described below in sections (1) to (8)). Also, the present disclosure may be embodied in various forms by appropriately combining plural elements of configuration in each of the above-described embodiments. For example, some elements of configuration among all the elements of configuration in the above-described embodiments may be omitted. Also, elements of configuration in different embodiments may be combined as appropriate. The drawings schematically illustrate elements of configuration in order to facilitate understanding, and properties of elements of configuration illustrated in the drawings, such as lengths and numbers thereof and distances therebetween, may differ from actual properties thereof in order to facilitate preparation of the drawings. Also, properties of elements of configuration described in the above embodiments, such as materials and shapes thereof, are merely examples and are not intended as specific limitations. Various alterations may be made within a scope not substantially deviating from configuration of the present disclosure.

(1) Marking may be of a lighter shade in a part of any of the marking areas M described above with reference to FIGS. 2A and 2B. In such a situation, the extracting section 12 extracts the original form character part RC depending on whether or not color density of the part of the marking area M in which the marking is of a lighter shade is at least predetermined density. The predetermined density is defined for example by a threshold value of brightness of the marking area M. The extracting section 12 determines whether or not the brightness is at least the threshold value through conversion of the marking area M to a gray scale image. In the marked character part MC5 illustrated in FIG. 2A, the marking is of a lighter shade in a part of the marking area M5 overlapping with the character "x". Brightness of the part of the marking area M5 in which the marking is of a lighter shade is lower than the threshold value. Therefore, the extracting section 12 extracts as the original form character part RC, "stuvw" from the marked character part MC5 (see Table 5).

(2) The selecting section 15 described above with reference to FIG. 5 selects the first candidate character part EP1 and other candidate character parts E from among the plurality of candidate character parts E (E1 to E7). However, the present disclosure is not limited to this configuration. For example, in an embodiment in which the number of the other candidate character parts E is zero, the selecting section 15 selects only the first candidate character part EP1 among the plurality of candidate character parts E. The generating section 16 generates the question Q using the first candidate character part EP1 as the answer A.

(3) The setting section 13 described above with reference to FIG. 3 sets the candidate character parts E1 to E7 as the plurality of candidate character parts E. However, the present disclosure is not limited to this configuration.

The setting section 13 may set as one of the plurality of candidate character parts E, a character part formed by adding the adjacent-to-end character NT to the end of the original form character part RC and adding the adjacent-to-beginning character NH to the beginning of the original form character part RC. This results in reduction of possibility of occurrence of discrepancy between a character part that the user intended to mark and the answer A in a situation in which a length of the marking area M is longer by a length of approximately a character than a length that the user intended to mark at each of the beginning and the end of the original form character part RC.

Also, the setting section 13 may set as one of the plurality of candidate character parts E, a character part formed by deleting the last character T and the first character H from the original form character part RC. This results in reduction of possibility of occurrence of discrepancy between a character part that the user intended to mark and the answer A in a situation in which a length of the marking area M is shorter by a length of approximately a character than a length that the user intended to mark at each of the beginning and the end of the original form character part RC.

Also, the setting section 13 may set as one of the plurality of candidate character parts E, a character part formed by adding two characters that include the adjacent-to-end character NT to the end of the original form character part RC and adding two characters that include the adjacent-to-beginning character NH to the beginning of the original form character part RC.

(4) Each of the marked character parts MC illustrated in FIGS. 2A and 2B is represented by alphabets each representing any character image. As described above with reference to FIG. 2A, the marked character part MC may be described in for example English. The following describes an example of determination of priority order in an embodiment in which the marked character part MC is a character image of an English word "nearly". A dictionary D (for example, an English-English dictionary) for the English language is stored in the storage 30 in advance. For example, in a situation in which the extracting section 12 has extracted an original form character part RC "nearl" from the marked character part MC "nearly", the setting section 13 sets "nearl", "nearly", "☐nearl", "near", "earl", "early", and "☐near" as a plurality of candidate character parts E (E1 to E7). The determining section 14 can set priority order of the plurality of candidate character parts E (E1 to E7) as shown in Table 6 on the basis of the first through sixth conditions described in FIG. 4.

TABLE 6

| | Original form character part nearl | | |
| Candidate character part | Represent original form character part? | Included in dictionary? | Priority order |
| --- | --- | --- | --- |
| nearl | YES | NO | 5th |
| nearly | NO | YES | 1st |
| ☐nearl | NO | NO | 6th |
| near | NO | YES | 2nd |
| earl | NO | YES | 3rd |
| early | NO | YES | 4th |
| ☐near | NO | NO | 7th |

(5) The dictionary D described above with reference to FIG. 4 is stored in the storage 30 in advance. However, the present disclosure is not limited to this configuration. For example, in an embodiment, the dictionary D may be stored in a cloud or an external device connected with the question generating device 100 via a communication network. The determining section 14 searches the dictionary D for the candidate character parts E via the communication network.

(6) In a situation in which the user selects a candidate character part E other than the first candidate character part EP1, the generating section 16 described above with reference to FIGS. 5 and 6 generates the question Q using the selected candidate character part E as the answer A. However, the present disclosure is not limited to this configuration. For example, the user can modify the first candidate character part EP1 by either or both adding and deleting a character through operation on the display 40. The generating section 16 generates the question Q using the character part modified by the user as the answer A.

(7) The generating section 16 described above with reference to FIGS. 5 and 6 generates the question Q that includes the blanks B (B1 to B5) corresponding to the answers A (A1 to A5). However, the present disclosure is not limited to this configuration. For example, the generating section 16 is capable of generating answer information that indicates the answers A (A1 to A5) only. The answer information is for example a word list made by extracting marked words only. The image forming apparatus 200 is capable of printing the answer information on the sheet P.

(8) In the table illustrated in FIG. 4, the conditions for determining the priority order of the plurality of candidate character parts E are indicated as the "first condition" through the "sixth condition" in order of higher importance. However, the present disclosure is not limited to this configuration. For example, the user can change the order of importance by reversing the order of the "fourth condition" and the "fifth condition" described in FIG. 4. Also, a condition other than the "first condition" through the "sixth condition" described in FIG. 4 may be added to the table.

What is claimed is:

1. A question generating device comprising:
    a reader configured to read a document a part of which is marked and generate a document image including a marking area and a character part representing characters forming a character string, the character part including a marked character part;
    an extracting section configured to extract an original form character part on the basis of the marked character part included in the document image, the original form character part representing an original form of a plurality of candidate character parts that are candidate answers to a question generated from the document image;
    a setting section configured to set as the plurality of candidate character parts, the original form character part and at least one character part formed by either or both adding a character to and deleting a character from the original form character part;
    a determination section configured to search a dictionary for each of the plurality of candidate character parts and determine priority order of each of the plurality of candidate character parts on the basis of whether or not the candidate character part is included in the dictionary;
    a selecting section configured to select a candidate character part of the highest priority from among the plurality of candidate character parts; and
    a generating section configured to generate the question using as an answer the candidate character part of the highest priority, wherein the marked character part includes characters forming a character string, at least a part of each of the characters overlapping with the marking area,
    the extracting section extracts as the original form character part any character overlapping with the marking area at least at a predetermined rate among the characters included in the marked character part, and
    the determination section determines the priority order of each of the plurality of candidate character parts further on the basis of: whether or not the candidate character part represents the original form character part; whether or not a difference between the candidate character part and the original form character part is only a single character; whether or not the candidate character part includes more characters than the other of the candidate character parts; whether or not a last character of the candidate character part differs from a last character of the original form character part; and whether or not the candidate character part is formed by adding a single character to an end of the original form character part and deleting a first character of the original form character part.

2. The question generating device according to claim 1, further comprising a display configured to display the candidate character part of the highest priority and an additional candidate character part from among the plurality of candidate character parts, wherein
    when the additional candidate character part is selected by a user, the generating section generates the question using as the answer the additional candidate character part instead of the candidate character part of the highest priority.

3. The question generating device according to claim 1, wherein
    when a candidate character part that represents the original form character part is included in the dictionary, the determining section determines the candidate character part that represents the original form character part as the candidate character part of the highest priority.

4. The question generating device according to claim 1, wherein
    the setting section sets each as one of the plurality of candidate character parts, a character part formed by adding a character that is adjacent to an end of the original form character part to the end of the original form character part, and a character part formed by adding a character that is adjacent to a beginning of the original form character part to the beginning of the original form character part.

5. The question generating device according to claim 1, wherein
the setting section sets each as one of the plurality of candidate character parts, a character part formed by deleting a last character of the original form character part from the original form character part, and a character part formed by deleting a first character of the original form character part from the original form character part.

6. The question generating device according to claim 1, wherein
the setting section sets each as one of the plurality of candidate character parts, a character part formed by adding a character that is adjacent to an end of the original form character part to the end of the original form character part and deleting a first character of the original form character part from the original form character part, and a character part formed by deleting a last character of the original form character part from the original form character part and adding a character that is adjacent to a beginning of the original form character part to the beginning of the original form character part.

7. The question generating device according to claim 1, wherein
the determining section determines that among the plurality of candidate character parts, priority order of a candidate character part that is included in the dictionary is higher than priority order of another candidate character part that is not included in the dictionary.

8. An image forming apparatus comprising:
the question generating device according to claim 1; and
an image forming section configured to form on a sheet an image representing the question.

9. A method for generating a question, comprising:
reading a document a part of which is marked and generating a document image including a marking area and a character part representing characters forming a character string, the character part including a marked character part;
extracting an original form character part on the basis of the marked character part included in the document image, the original form character part representing an original form of a plurality of candidate character parts that are candidate answers to a question generated from the document image;
setting as the plurality of candidate character parts, the original form character part and at least one character part formed by either or both adding a character to and deleting a character from the original form character part;
searching a dictionary for each of the plurality of candidate character parts and determining priority order of each of the plurality of candidate character parts on the basis of whether or not the candidate character part is included in the dictionary;
selecting a candidate character part of the highest priority from among the plurality of candidate character parts; and
generating the question using as an answer the candidate character part of the highest priority, wherein
the marked character part includes characters forming a character string, at least a part of each of the characters overlapping with the marking area,
in the extracting, any character overlapping with the marking area at least at a predetermined rate is extracted as the original form character part among the characters included in the marked character part, and
in the determining of the priority order, the priority order of each of the plurality of candidate character parts is determined further on the basis of: whether or not the candidate character part represents the original form character part; whether or not a difference between the candidate character part and the original form character part is only a single character; whether or not the candidate character part includes more characters than the other of the candidate character parts; whether or not a last character of the candidate character part differs from a last character of the original form character part; and whether or not the candidate character part is formed by adding a single character to an end of the original form character part and deleting a first character of the original form character part.

10. The question generating device according to claim 1, wherein
the setting section sets each as one of the plurality of candidate character parts: a character part formed by adding a character that is adjacent to an end of the original form character part to the end of the original form character part; a character part formed by adding a character that is adjacent to a beginning of the original form character part to the beginning of the original form character part; a character part formed by deleting a last character of the original form character part from the original form character part; a character part formed by deleting a first character of the original form character part from the original form character part; a character part formed by adding the character that is adjacent to the end of the original form character part to the end of the original form character part and deleting the first character of the original form character part from the original form character part; and a character part formed by deleting the last character of the original form character part from the original form character part and adding the character that is adjacent to the beginning of the original form character part to the beginning of the original form character part.

* * * * *